United States Patent [19]

Palma et al.

[11] Patent Number: 5,317,227
[45] Date of Patent: May 31, 1994

[54] ROTOR WITH HOLLOW CYLINDRICAL PERMANENT MAGNET

[75] Inventors: Rodolfo Palma, Troy; William H. Miller, Loudonville, both of N.Y.

[73] Assignee: REM Technologies, Inc., Schenectady, N.Y.

[21] Appl. No.: 986,675

[22] Filed: Dec. 8, 1992

[51] Int. Cl.⁵ .......................................... H02K 21/12
[52] U.S. Cl. ...................................... 310/156; 310/269
[58] Field of Search ............. 310/156, 114, 168, 261, 310/269, 91, 254, 258

[56] References Cited

U.S. PATENT DOCUMENTS

| | | | |
|---|---|---|---|
| 3,581,394 | 6/1971 | Phelon | 310/156 |
| 3,708,703 | 1/1973 | Dove | 310/10 |
| 4,385,251 | 5/1983 | Mallick et al. | 310/178 |
| 4,556,809 | 12/1985 | Beisse et al. | 310/144 |
| 4,698,538 | 10/1987 | Yoshida | 310/179 |
| 4,755,701 | 7/1988 | Shikama | 310/156 |
| 4,782,259 | 11/1988 | Shikama et al. | 310/156 |
| 4,786,834 | 11/1988 | Grant et al. | 310/168 |
| 4,866,323 | 9/1989 | Oudet et al. | 310/269 |
| 4,888,512 | 12/1989 | Shimizu | 310/156 |
| 5,001,378 | 3/1991 | Miller et al. | 310/269 |
| 5,018,571 | 5/1991 | Holmberg et al. | 165/41 |

*Primary Examiner*—Steven L. Stephan
*Assistant Examiner*—Matthew Nguyen
*Attorney, Agent, or Firm*—Heslin & Rothenberg

[57] ABSTRACT

A rotor for a dynamoelectric machine, without windings and rotatable about a central longitudinal axis, having an axially extending rotatable body and a toroidal magnet coaxially mounted on the body is constructed to provide magnetic exitation for the rotor. The rotatable body contains a first set of circumferentially spaced axially extending salient poles with circumferentially spaced recesses therebetween and a second set of similar poles at an opposite axial location. The toroidal magnet is coaxially mounted on the body between the first and second set of salient poles. A second toroidal magnet may also be mounted on the body and a magnetic spacer placed in between both toroidal magnets.

16 Claims, 4 Drawing Sheets

ROTOR WITH HOLLOW CYLINDRICAL PERMANENT MAGNET

BACKGROUND OF THE INVENTION

This invention relates generally to dynamoelectric machines and more specifically to an improved rotor construction for a dynamoelectric machine which helps facilitate magnetic exitation of the rotor.

Inductor type dynamoelectric machines have been employed, in the past, to achieve high speed operation, particularly for electrical generation. These machines are generally characterized by a stator which includes both AC armature and DC exitation windings, surrounding a rotor. The rotor is winding-less thereby eliminating the need for rotating field or armature coils. Accordingly, slip rings, brushes and associated connections common to machines having rotating windings are entirely eliminated. The coil-less rotor allows the dynamoelectric inductor machine to achieve high rotational speeds. The rotor is homopolar and requires magnetic excitation from the DC exitation windings to create a magnetic field which rotates the rotor.

One typical version of an inductor type dynamoelectric machine, employs a circumferentially distributed arrangement of C-shaped (sometimes referred to as "U-shaped") armature elements which surround a generally cylindrical DC exitation or field coil which in turn encloses a transverse pole magnetic rotor. U.S. Pat. Nos. 5,219,097 and 3,912,958 describe machines of this general design. These machines typically employ frame mounted hardware for directly supporting the individual components of the stator but exhibit deficiencies inherent with this construction.

A more recent version of an inductor type dynamoelectric machine is disclosed in commonly owned, U.S. Pat. No. 4,786,834, issued Nov. 22, 1988 in the name of James J. Grant, et al. As disclosed therein, a spool-like support structure for supporting the field winding and armature elements from inside and for accurately positioning armature elements provides for a more stable machine particularly at high rotational speeds. The spool-like structures which are made of a non-magnetic material have a hollow, elongated central portion extending concentrically about a longitudinal axis. This central portion supports a DC field winding and defines an interior longitudinal passageway for accommodating the insertion of a coaxial rotor. At each end of the central portion, end portions extend radially outward therefrom. Each of these end portions is preferably provided with radially oriented grooves in its axially outermost surface. The grooves are configured to receive and orient legs of the C-shaped armature core elements arrayed in a circumferentially distributed pattern about the periphery of the spool-like structure. The end portions of the spool-like structure are axially spaced and radially dimensioned having grooves in the outer face of each end portion which are angularly spaced so as to precisely position the armature elements in three orthogonal directions.

Other features, aspects, advantages and benefits of this dynamoelectric machine are detailed in U.S. Pat. No. 4,786,834, the disclosure of which is incorporated herein by reference. This particular dynamoelectric machine requires the use of DC field windings to generate a magnetic field therethrough and through the homopolar rotor to facilitate rotation of the rotor. Therefore DC power to create this magnetic field must be supplied to the field windings. The field windings comprise a helically wound conductive wire which forms a coil that surrounds the rotor. Because of the volume occupied by the field windings, access to the rotor for cooling is limited. Moreover, due to the production of DC current through the windings, heat is actually created within the windings due to the resistivity of the windings. Because the magnetic field is created by the DC windings, the magnetic flux is dictated by the number of windings within the exitation coil. However, the length of the DC exitation coil also dictates the length of the C-shaped armature element and therefore the overall length of the rotor and dynamoelectric machine.

It is therefore an object of the present invention to achieve a dynamoelectric machine which eliminates the need for DC current to be supplied thereto.

It is also an object of the present invention to achieve a dynamoelectric machine which is capable of providing magnetic exitation to the rotor without the use of field windings or exitation coils.

It is also an object of the present invention to achieve a dynamoelectric machine which contains a structure that facilitates improved cooling.

It is also an object of the present invention to provide a rotor construction which is mechanically strong and stable and may be easily manufactured.

It is also an object of the present invention to provide a dynamoelectric machine construction which facilitates the use of shorter C-shaped armature elements thereby enabling the overall length of the dynamoelectric machine to be shorter.

SUMMARY OF THE INVENTION

The aforementioned objects are achieved, and additional benefits are realized, in accordance with the principles of the present invention, by a winding-less rotor for a dynamoelectric machine comprising an axially extending elongate rotatable body, and a toroidal magnet coaxially mounted on the body. The elongate rotatable body may contain a first set of circumferentially spaced axially extending salient poles with circumferentially spaced recesses therebetween at one axial location and a second set of circumferentially spaced axially extending salient poles with recesses therebetween at an opposite axial location. The toroidal magnet is coaxially mounted on the body in between the first and second set of salient poles. A pair of magnetic spacers may be mounted on the rotatable body such that the toroidal magnet is mounted between the spacers.

The shaft may have a shoulder at one end enabling the first and second sets of circumferentially spaced axially extending salient poles to be mounted on a mandrel portion of the shaft and the toroidal magnet held therebetween by a retaining collar threaded to threads at the opposite end of the mandrel portion of the shaft.

A second toroidal magnet may be coaxially located on the body between the first and second set of circumferentially spaced axially extending salient poles wherein facing sides of the first and second toroidal magnets are of opposite polarities. A spacer may be located between the toroidal magnets on the body. The shaft may have a shoulder at one end such that the first and second sets of circumferentially spaced axially extending salient poles are mounted on a mandrel portion of the shaft and the first and second toroidal magnet and are held therebetween by a retaining collar threaded to threads located at the opposite end of the shaft.

The rotor may be incorporated into a dynamoelectric machine having a stator assembly with a non-magnetic spool-like structure and a hollow, elongated central portion extending about the rotor. The spool-like structure may have axially spaced end portions that extend radially outward relative to the longitudinal axis from respective ends of the central portion along with a plurality of circumferentially distributed generally C-shaped, generally longitudinally oriented armature core supported by the end portions of the spool-like structure.

BRIEF DESCRIPTION OF THE DRAWINGS

These and other objects, advantages and features of the present invention will be more readily understood from the following detailed description, when considered in conjunction with the accompanying drawings, in which.

DETAILED DESCRIPTION

Figure 1:
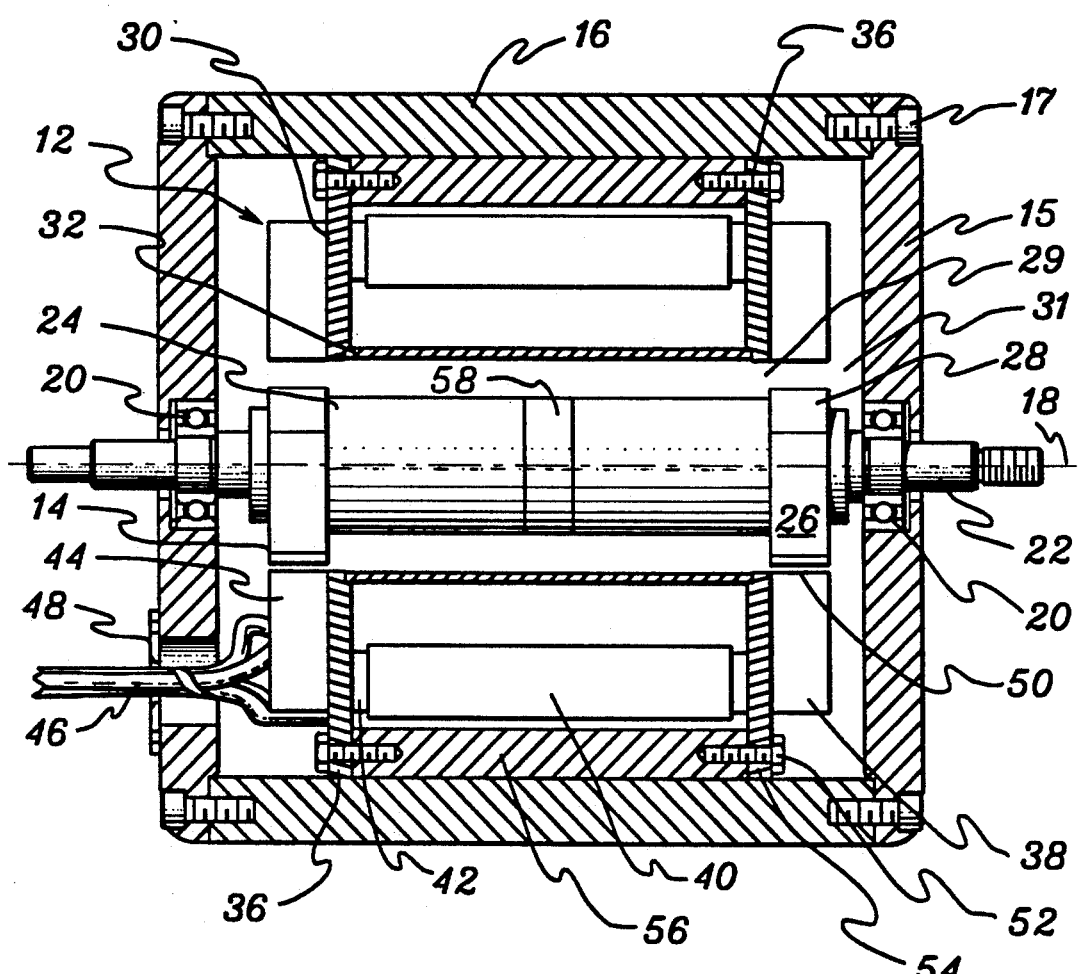
FIG. 1 is a sectional view from the side of an inductive type dynamoelectric machine having a rotor constructed in accordance with the principles of the present invention.

In FIG. 1, a transverse-pole AC inductor type rotating dynamoelectric machine, constructed in accordance with the principles of the present invention is shown. The machine, generally denoted 10, includes a stationary stator assembly 12 surrounding a rotatable, coil-less rotor 14. A surrounding housing or frame 16 encloses the stator assembly 12. The ends of the housing support the ends 22 of the rotor 14.

Stator assembly 12 includes an internal spool-like support structure 30. Support structure 30 has a central, generally cylindrical portion or tube 32 which is coaxial with longitudinal axis 18 and defines an interior longitudinally extending, central passageway for receiving the rotor 14.

Stator support structure 30 also includes a pair of end portions or plates 36 extending radially outward from the ends of tube 32. End portions 36 serve to mount and precisely position a plurality of circumferentially distributed, C-shaped (also referred to as U-shaped or arc-shaped) armature core elements 38. Each armature core element 38 is provided with an individual AC armature coil 40 wound about, and supported by a generally longitudinally extending base portion 42 of the armature element. Legs 44 extend radially inward from each end of base portion 42 of armature element 38. Armature core elements 38 are made of magnetic material while the support structure 30 is composed of a non-magnetic material. Electrical leads 46 from the field and armature coils extend through a suitable connector 48 mounted at one end of the housing or frame 16 or at any other suitable location.

Stator assembly 12 may be positioned and mounted within housing 16 by threaded fasteners 52 extending through radial extensions 54 of end portions 36 into intermediate mounting supports 56. The mounting supports 56 may be circumferentially distributed about and secured to the interior of housing 16. This mounting arrangement is described in commonly owned U.S. Pat. No. 5,006,748 entitled "Stator Mounting Arrangement", and is incorporated herein by reference. Also, various methods of utilizing the support ring (not shown) to support the stator assembly are described in detail in co-pending, commonly owned U.S. patent application Ser. No. 763,632 filed Sep. 23, 1991 entitled "Stator Support and Positioning Structure for a Dynamoelectric Machine" which is incorporated herein by reference. Other stator mounting arrangements may be used, however, in a dynamoelectric machine incorporating the rotor constructed in accordance with the principles of the present invention.

Operation of the dynamoelectric machine 10 is typical of synchronous AC machines in that, if the rotor 14 is rotated by some external means, a voltage will be induced in the armature windings 40 in the manner of a generator. Similarly, if the armature windings are energized in a fashion such as to produce a rotating flux wave at the gap 50, which exists between the radially innermost ends of the armature elements 38 and rotor pole surfaces 28, as is done in polyphase, AC synchronous machines, the rotor 14 of the machine will be urged to follow the armature flux wave and rotate in the manner of an electric motor.

The end portions 36 of the spool-like structures 30 may be made of a laminate construction, as described in U.S. Pat. No. 4,846,176. Additional details regarding the construction and operation, and the benefits afforded by an inductor type rotating dynamoelectric machine utilizing the general principles and configuration discussed herein may be obtained by referring to U.S. Pat. No. 4,786,834.

The rotor 14 extends along and is coaxial with the longitudinal axis 18. The rotor is supported by bearings 20, at each of the rotor shaft ends 22. The bearings 20 are mounted within the ends of the housing or frame 16. The rotor may contain circumferentially spaced and axially extending surface recesses or cutouts 26 at the ends thereof, which define a desired number or set of lobes or salient poles 28 at each end of the rotor. In accordance with the principles of the present invention, one or more toroidal magnets 58 may be coaxially arranged on the rotor 14 between each of the sets of circumferentially spaced and axially extending lobes 28.

Figure 2:
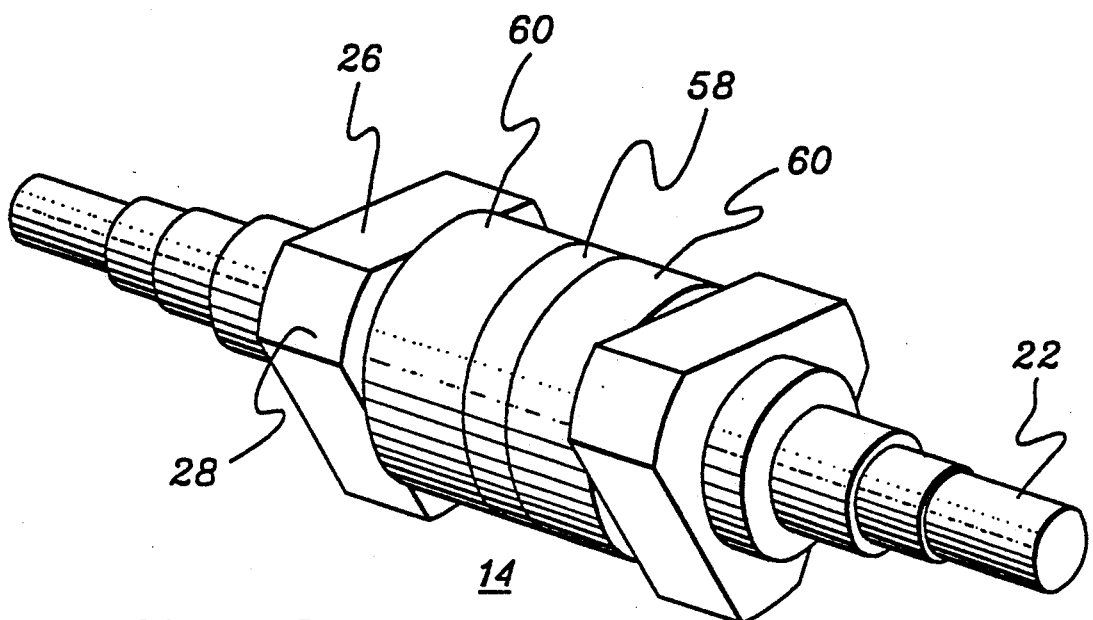
FIG. 2 is an isometric view of a rotor constructed in accordance with the principles of the present invention and useable in the dynamoelectric machine of FIG. 1.
Figure 3:
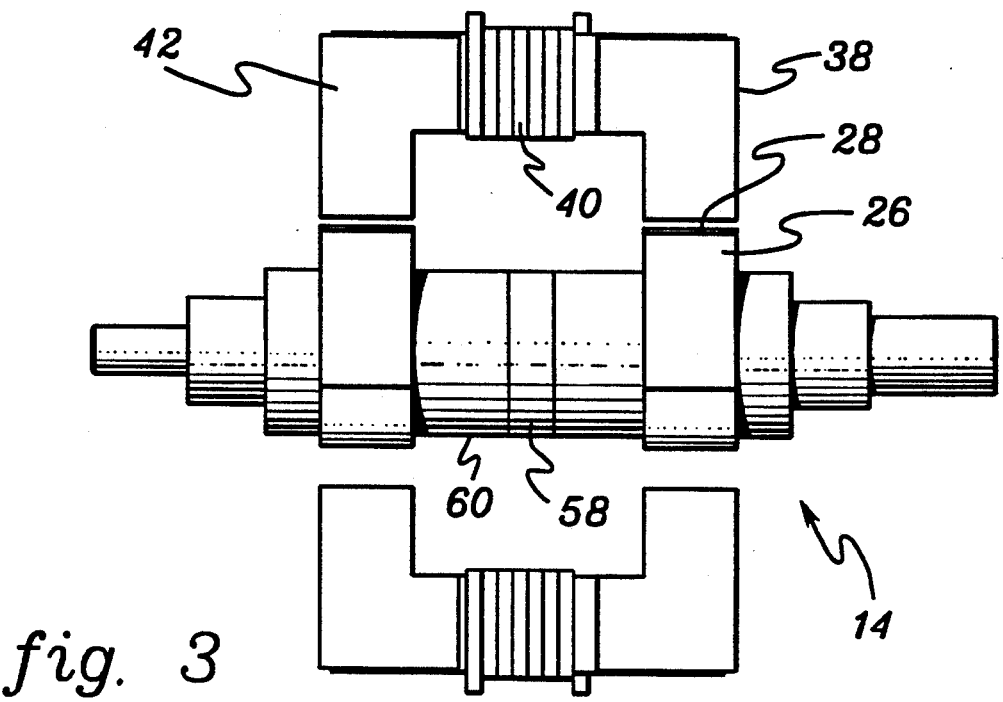
FIG. 3 is a side-elevational view useful in understanding the magnetic centering feature of the present invention and depicting a reduced diameter central body portion of the rotor containing a hollow cylindrical permanent magnet therein.

Referring now to FIGS. 2 and 3, a homopolar rotor 14, constructed in accordance with the principles of the present invention, and useable in the dynamoelectric machine depicted in FIG. 1 is disclosed. The rotor 14 contains a set of lobes or salient poles 28 having circumferentially spaced and axially extending surface resets or cut-outs 26 therebetween. The sets of lobes or salient poles 28 and cut-outs 26 are located towards the ends 22 of the rotor 14. Coaxially oriented and located in between the sets of salient poles 28 are a pair of spacers 60. The spacers 60 are also preferably toroidal in shape. Coaxially oriented between the pair of spacers 60 is the toroidal magnet 58. The salient poles 28 and spacers 60 should each be constructed of a magnetic material such as a steel or steel alloy, etc. The toroidal magnet 58 is configured such that its poles are facing in the axial direction. Referring to FIG. 3, the rotor facilitates the magnetic flux to flow from the C-shaped armature elements 38 into the salient poles 28 of the rotor and axially through the rotor 14 including the spacers 60 and toroidal magnet 58.

Figure 5:
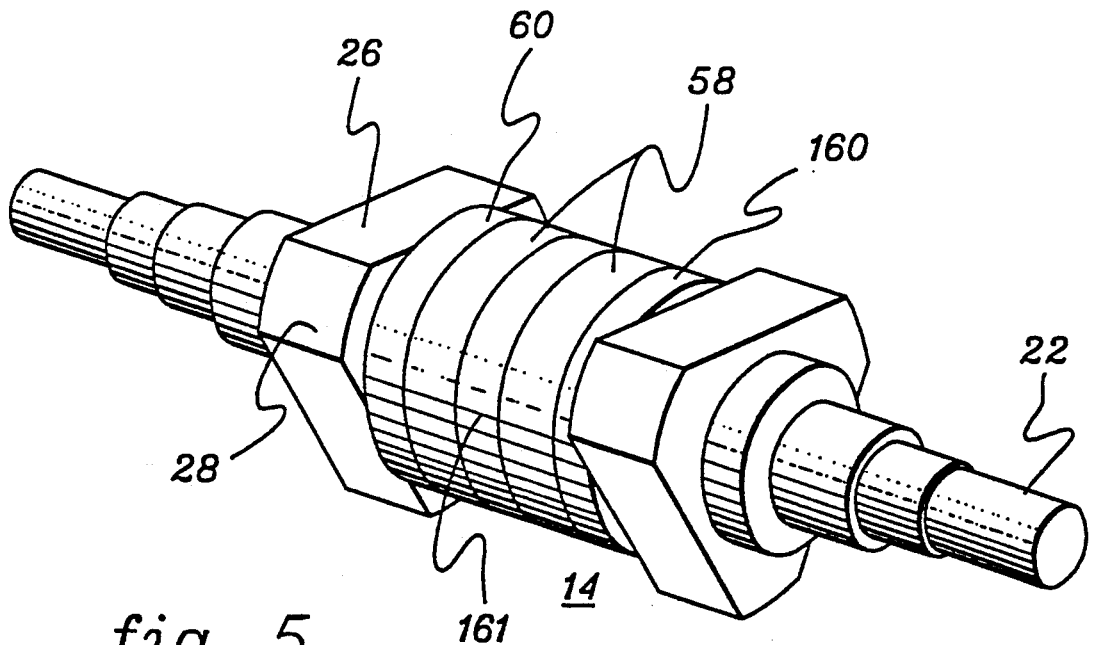
FIG. 5 is an isometric view of an alternate embodiment of the rotor having a pair of hollow cylindrical permanent magnets usable in the dynamoelectric machine depicted in FIG. 1.
Figure 6:
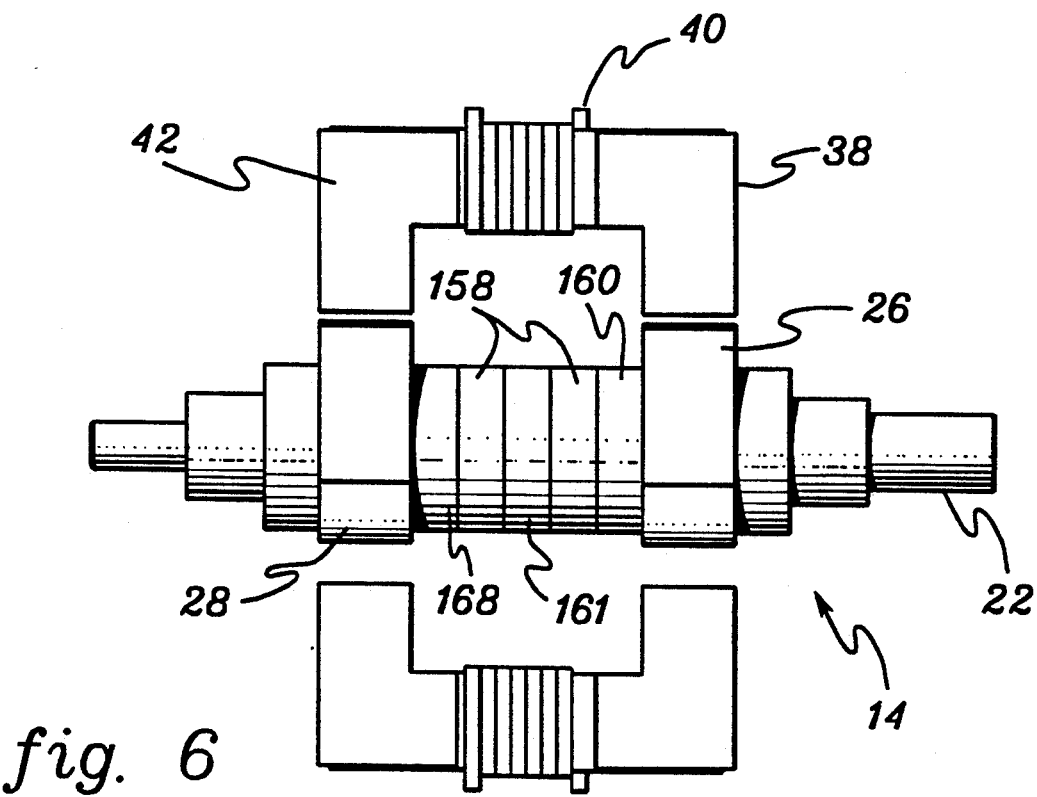
FIG. 6 is a side elevational view of the rotor having a hollow cylindrical permanent magnet depicted in FIG. 5 useful in understanding the orientation of the rotor constructed in accordance with the principles of the present invention within a dynamoelectric machine.

Depicted in FIGS. 5 and 6 is another embodiment of the rotor in accordance with the principles of the present invention. The rotor 14, contains a pair of toroidal magnets 158 which are coaxially oriented thereon. A central spacer 161 is also coaxially oriented in between the pair of toroidal magnets 158 on the rotor 14 on each side of the center spacer 161. Each of the toroidal magnets 158 is coaxially oriented between one of the end spacers 160 and the central spacer 161. Each end spacer 160 is coaxially oriented between a set of salient poles 28 at one end 22 of the rotor and one toroidal magnet 158. The toroidal magnets 158 and spacers 160, 161 are each coaxially oriented on the rotor 14 such that their poles are oriented in the same axial direction. The spacers 160, 161 are made of a magnetic material, such as steel or other magnetic metal alloy, to allow the magnetic flux to flow therethrough. Referring to FIG. 6, the rotor having the pair of toroidal magnets 158 facilitates the magnetic flux to flow from the C-shaped armature elements 38 into the salient poles 28 of the rotor and axially through the rotor 14 including the spacers 161 and magnets 158.

Figure 4:
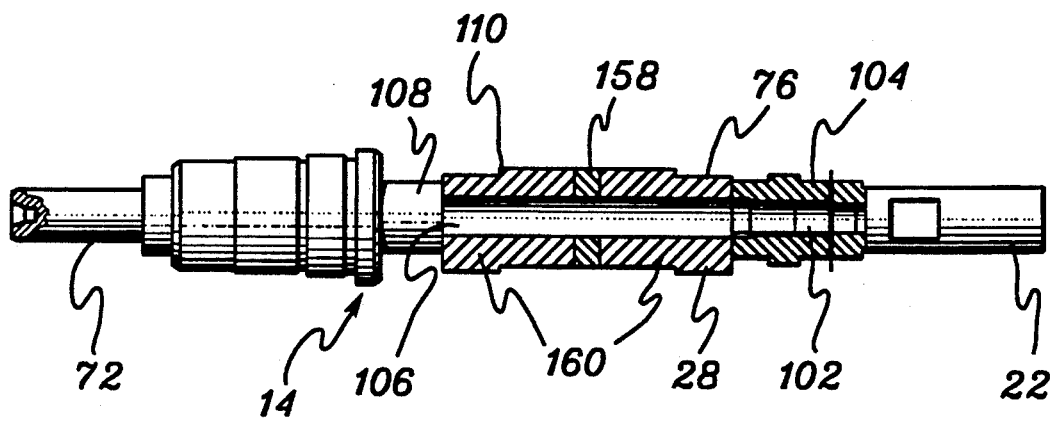
FIG. 4 depicts a sectional view from the side of an alternative embodiment of a rotor having a single hollow cylindrical permanent magnet constructed in accordance with the principles of the present invention.

Depicted in FIG. 4 is an alternative embodiment of the rotor having a hollow permanent magnet 158 thereon constructed in accordance with the principles of the present invention. The rotor 14 contains a mandrel portion 103 having a threaded end 102. The mandrel portion begins at a shoulder 108 of the rotor 14. Two collars 110 are coaxially mounted on the mandrel portion 106. Each collar 110 includes a set of salient poles 28 with circumferentially spaced recesses 26 therebetween. Each collar 110 also includes a spacer section 160 which is integrally formed with the sets of salient lobes 28 and circumferentially spaced recesses 26. The toroidal magnet 158 is coaxially mounted between two sets of collar portions which are oriented such that the salient lobes 28 are located towards the ends 22 of the rotor 14. The collars 110 and toroidal magnet 158 are mounted upon the rotor 14 by insertion of the mandrel portion 106 of the rotor 14 into a center opening of each collar 110 and into a center opening of the toroidal magnet 158. A threaded retaining collar 104 is threadably engagable to the threaded end 102 of the rotor 14. By threading the retaining collar 104 onto the threaded end 102, the toroidal magnet 158 and collars 110 may be compressed onto the mandrel portion 106.

Figure 7:
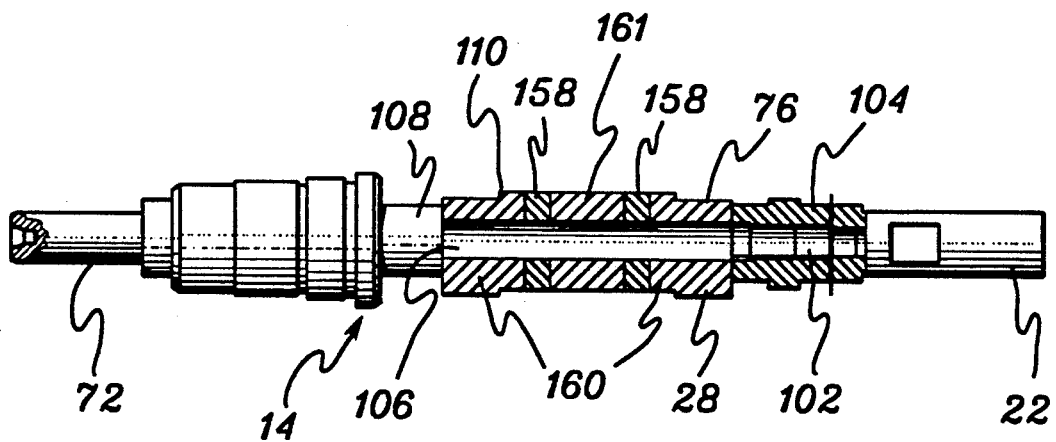
FIG. 7 depicts a sectional view from the side of an alternate embodiment of a rotor having a hollow cylindrical permanent magnet as depicted in FIG. 6.

Referring to FIG. 7, a rotor similar in construction to that depicted in FIG. 4 but having a pair of toroidal magnets 158, is depicted therein. Collars 110 are mounted outside of toroidal magnets 158 and a center spacer 161 is located between the toroidal magnets. The toroidal magnets 158, center spacer 161, and collar sections 110, are coaxially mounted on the mandrel section 106 of the rotor 14. Collars 110 have spacer portions 160 integrally formed with the salient poles 28 and circumferentially spaced cut-outs 26.

The rotor 14 constructed in accordance with the principles of the present invention may also be constructed where the circumferentially spaced recesses 26 between salient poles 28 are filled with nonmagnetic material which is often deposited by plasma-hot arc wire welding process. Various configurations for salient poles 28 and circumferentially spaced recesses therebetween 26 filled with non-magnetic materials are depicted in commonly owned U.S. Pat. No. 5,001,378, which is incorporated into the specification herewith by reference.

From the foregoing description, it will be apparent that an improved rotor assembly has been developed which enables magnetic exitation of the rotor without the use of DC field windings on the stator assembly of a dynamoelectric machine. The rotor is magnetically self-centering, highly efficient, and capable of operating at high speeds over sustained periods of time. The rotor may be intricately formed or formed from various pieces which are amenable to rapid, ready, and economical manufacture and assembly. Although certain embodiments have been described and depicted herein, it will be apparent to those skilled in the art that various modifications, additions, and substitutions and the like may be made without departing in any way from the spirit of the invention as defined by the following claims.

We claim:

1. A winding-less rotor for a dynamoelectric machine rotatable about a central longitudinal axis comprising:
   an axially extending elongate rotatable body containing a first set of circumferentially spaced axially extending salient poles with circumferentially spaced recesses therebetween at one axial location and a second set of circumferentially spaced axially extending salient poles with recesses therebetween at an opposite axial location; and
   a single toroidal magnet coaxially mounted on said body wherein the toroidal magnet is coaxially oriented on the body between the first and second set of circumferentially spaced axially extending salient poles.

2. The rotor of claim 1 further comprising a pair of magnetic spacers on the body wherein the toroidal magnet is located between the magnetic spacers on the body.

3. The rotor of claim 2 wherein the axially extending elongate rotatable body comprises a shaft having a shoulder at one end thereof, said first and second sets of circumferentially spaced axially extending salient poles with recesses therebetween being part of a first and second collar supported on a mandrel portion of said shaft, and said toroidal magnet and magnetic spacers being held therebetween by a retaining collar threaded to threads located at the opposite end of the mandrel portion of said shaft.

4. The rotor of claim 1 wherein the axially extending elongate rotatable body comprises a shaft having a shoulder at one end thereof, said first and second sets of circumferentially spaced axially extending salient poles with recesses therebetween being part of a first and second collar having the magnetic spacers as an integral part thereof supported on a mandrel portion of said shaft, and said toroidal magnet being held therebetween by a retaining collar threaded to threads located at the opposite end of the mandrel portion of said shaft.

5. A winding-less rotor for a dynamoelectric machine rotatable about a central longitudinal axis comprising:
an axially extending elongate rotatable body containing a first set of circumferentially spaced axially extending salient poles with circumferentially spaced recesses therebetween at one axial location and a second set of circumferentially spaced axially extending salient poles with recesses therebetween at an opposite axial location; and
first and second toroidal magnets coaxially mounted and oriented on said body between the first and second set of circumferentially spaced axially extending salient poles wherein facing sides of the first and second toroidal magnets are of opposite polarities.

6. The rotor of claim 5 further comprising a magnetic spacer coaxially oriented on the body between the first and second toroidal magnets.

7. The rotor of claim 6 wherein the axially extending elongate rotatable body comprises a shaft having a first collar at one end thereof, said first and second sets of circumferentially spaced axially extending salient poles with recesses therebetween being mounted on said shaft and said first toroidal magnet, second toroidal magnet, and magnetic spacer being held therebetween by a second retaining collar threaded to threads located at an opposite end of the shaft.

8. The rotor of claims 3 or 7 wherein the first and second collars are formed by the salient poles being integral with the magnetic spacers.

9. A dynamoelectric machine having a stator assembly comprising a non-magnetic spool-like structure having a hollow, elongated central portion extending about the rotor, said spool-like structure having axially spaced end portions that extend radially outward relative to a longitudinal axis from respective ends of the central portion and a circumferentially distributed plurality of generally C-shaped, generally longitudinally extending armature cores supported by the end portions of the spool-like structure, said dynamoelectric machine further including a windingless rotor comprising:
an axially extending elongate rotatable body; and
one or more toroidal magnets coaxially mounted on said body so that facing sides of said magnets are of opposite polarities where there is more than one of said toroidal magnets.

10. The dynamoelectric machine of claim 9 wherein the axially extending elongate rotatable body contains a first set of circumferentially spaced axially extending salient poles with circumferentially spaced recesses therebetween and a second set of circumferentially spaced axially extending salient poles with recesses therebetween at an opposite axial location wherein the one or more toroidal magnets are coaxially located on the body in between the first and second set of circumferentially spaced axially extending salient poles.

11. The dynamoelectric machine of claim 10 wherein said toroidal magnets include first and second toroidal magnets coaxially located on said body wherein facing sides of the first and second toroidal magnets are of opposite polarities.

12. The dynamoelectric machine of claim 11 further comprising a magnetic spacer coaxially located on the body between the first and second toroidal magnets.

13. The dynamoelectric machine of claim 10 further comprising a pair of magnetic spacers located on the body wherein the one or more toroidal magnets are located between the magnetic spacers on the body.

14. The dynamoelectric machine of claim 13 wherein the axially extending elongate rotatable body comprises a shaft having a shoulder at one end thereof, said first and second sets of circumferentially spaced axially extending salient poles with recesses therebetween being parts of a first and second collar supported on a mandrel portion of the shaft, and said one or more toroidal magnets and magnetic spacers being held therebetween by a retaining collar threaded to threads located at the opposite end of the mandrel portion of the shaft.

15. The dynamoelectric machine of claim 10 wherein the axially extending elongate rotatable body comprises a shaft having a shoulder at one end thereof, said first and second sets of circumferentially spaced axially extending salient poles with recesses therebetween being parts of a first and second collar supported on a mandrel portion of said shaft, and said one or more toroidal magnets being held therebetween by a retaining collar threaded to threads located at the opposite end of the mandrel portion of the shaft.

16. The dynamoelectric machine of claim 12 wherein the axially extending elongate rotatable body comprises a shaft having a shoulder at one end thereof, said first and second sets of circumferentially spaced axially extending lobes with recesses therebetween being mounted on a mandrel portion of said shaft and said first toroidal magnet, second toroidal magnet, and magnetic spacer being held therebetween by a retaining collar threaded to threads located at an opposite end of the shaft.

* * * * *